United States Patent [19]

Welsch

[11] Patent Number: 4,627,994

[45] Date of Patent: Dec. 9, 1986

[54] LABEL BEARING CONTINUOUS BUSINESS FORM

[75] Inventor: Bernhard J. Welsch, Cary, Ill.

[73] Assignee: Uarco Incorporated, Barrington, Ill.

[21] Appl. No.: 819,380

[22] Filed: Jan. 16, 1986

[51] Int. Cl.[4] .................................................. B32B 3/06

[52] U.S. Cl. ........................................ 428/41; 428/43; 428/57; 428/58; 428/138; 428/189; 428/192; 282/11.5 A; 282/12 A

[58] Field of Search ...................... 428/40, 41, 57, 138, 428/43, 189, 58, 192; 282/11.5 A, 12 A, 12 R; 283/61, 62; 40/2 R

[56] References Cited

U.S. PATENT DOCUMENTS 3,111,449 11/1963 Gold et al. ............................ 428/40

*Primary Examiner*—Alexander S. Thomas
*Attorney, Agent, or Firm*—Wood, Dalton, Phillips, Mason & Rowe

[57] ABSTRACT

A continuous business form including an elongated ply of label stock having one side coated with a pressure sensitive adhesive and of a desired width. An elongated ply of release liner stock of the same width is engaged with the adhesive in such a way that the plies are laterally offset. Consequently, a narrow longitudinal strip of adhesive unengaged with the release liner exists on the label stock ply. An elongated ply of record or message bearing stock is adhered to such edge of the label stock at the narrow longitudinal strip of adhesive.

9 Claims, 5 Drawing Figures

FIG. 1
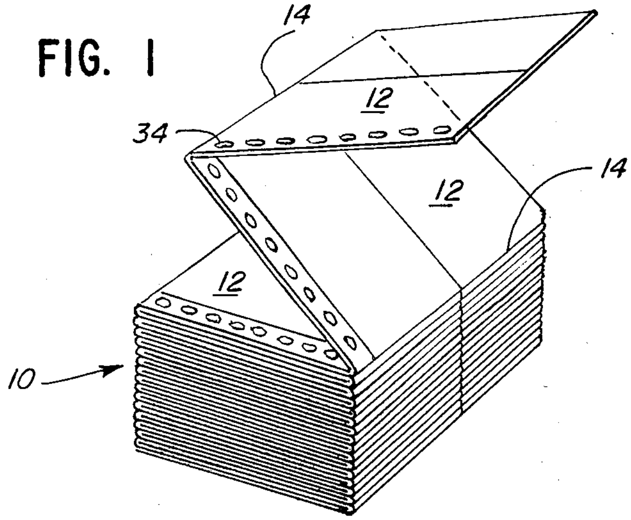
FIG. 2
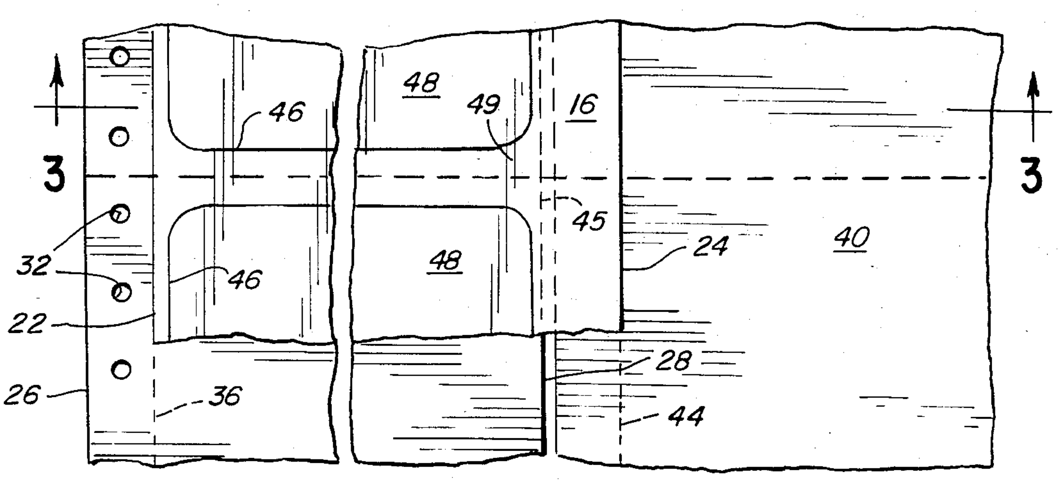
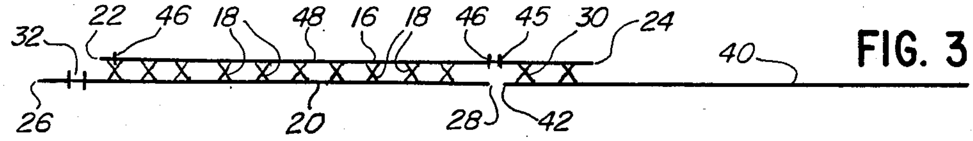
FIG. 3
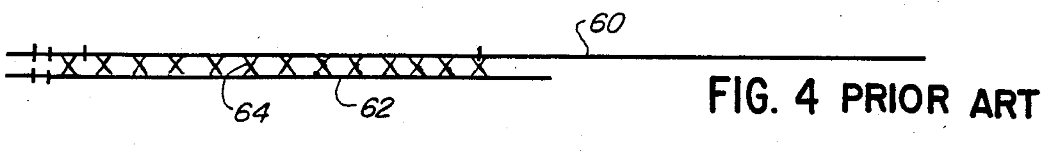
FIG. 4 PRIOR ART
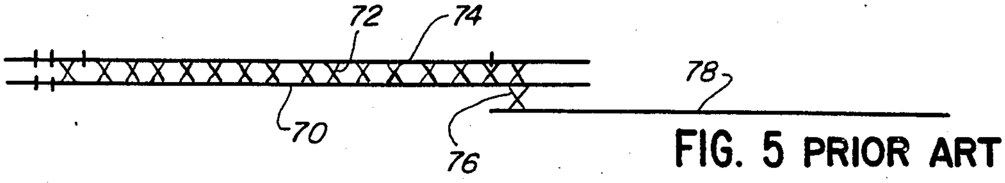
FIG. 5 PRIOR ART

LABEL BEARING CONTINUOUS BUSINESS FORM

FIELD OF THE INVENTION

This invention relates to continuous business forms, and more particularly, to a continuous business form bearing one or more removable, pressure-sensitive labels, as well as a message or record-bearing section.

BACKGROUND OF THE INVENTION

As is well known in the continuous business form art, there is a large variety of uses for label bearing continuous business forms. One particularly popular type of label bearing form includes one section which is provided with one or more pressure-sensitive adhesive backed labels and an adjacent section on which variable information may be printed and retained.

Of this general type, there are two differing constructions which are in use today. In one, a relatively wide ply is adhered to a relatively narrow ply by pressure-sensitive adhesive contained on the former. At least at the point of adhesion of the former to the latter, the narrow ply is coated with a waxy material so as to serve as a conventional release liner for the narrow ply, which in turn, defines a pressure-sensitive adhesive label section overlying the narrow ply.

The part of the wide ply that does not overlie the label section then serves as a record or message bearing portion of the business form.

One difficulty with this construction is that the wide ply serves as both the label section and the record or message bearing portion of the form which means that in those instances where it is desirable for any of a variety of reasons that the label be formed of a material or stock different than that used to form the record or message bearing portion, such a construction cannot be satisfactorily employed.

Another prior art construction, which is not subject to the foregoing difficulty, is one wherein conventional adhesive label stock is adhered to conventional business form or record keeping stock. To provide a record or message bearing portion for the business form, a longitudinal glue line is placed along one edge of the release liner on the side thereof opposite the label stock, and an elongated ply adhered to the combined release liner and label stock by such glue line.

In this construction, the added ply serves as the record or message bearing portion and obviously can be formed of any suitable or desired material, which can be quite different from that utilized in forming the release liner. However, in some sorts of processing equipment, this type of form can pose a difficulty because of the thickness of the form at the junction of the record or message bearing ply and the release liner. In particular, the thickness of the form at this location is equal to the sum of the thickness of the record or message bearing ply, the thickness of the release liner, the thickness of the label stock, the thickness of the pressure sensitive adhesive between the release liner and the label stock, and the thickness of the glue line adhering the release liner and the record or message bearing stock. This thickness adds rigidity to the form which may make processing on certain types of equipment difficult. In addition, in some cases, the thickness alone may tend to cause form components to hang up in certain types of printers or the like.

The present invention is directed to overcoming one or more of the above problems.

SUMMARY OF THE INVENTION

It is the principal object to provide a new and improved business form. More specifically, it is an object of the invention to provide a new and improved business form of the label bearing type which is additionally provided with a record or message bearing section.

An exemplary embodiment of the invention achieves the foregoing object in a business form including an elongated ply of label stock of a desired width and having one side coated with a pressure sensitive adhesive. An elongated ply of release liner stock of about the desired width and having a release side engaged with the adhesive is provided. The release liner and the label stock ply are laterally offset from one another so that a narrow longitudinal strip of adhesive unengaged with the release liner exists. An elongated ply of record or message bearing stock is adhered at one edge to the label stock at the narrow longitudinal strip of adhesive.

As a consequence of this construction, the release liner and the record or message bearing stock may be of different materials while the thickness of the form where the record or message bearing ply is adhered to the label stock is equal to the thicknesses of both plus the thickness of the pressure sensitive adhesive, a considerable reduction over prior art constructions wherein the release liner and the record or message bearing stocks are of different materials, and no greater than the thickness of the prior art constructions requiring the release liner and the message or record bearing ply to be of the same stock.

A preferred embodiment of the invention contemplates that the longitudinal edge of the release liner remote from the narrow longitudinal strip of adhesive is uncovered on both sides and includes aligned holes defining a control punch margin for form feeding purposes.

The invention also contemplates that the form be delimited into individual form lengths by cross lines of weakening extending across the plies.

The invention further contemplates that the release liner and the label stock plies be of equal width and be laterally offset from each other by firstly delaminating coextensive release liner and label stock plies, laterally shifting one of such plies relative to the other, and relaminating the release liner and label stock plies.

Die cuts may be provided in the label stock to define individual labels that may be peeled from the release liner stock.

Other objects and advantages will become apparent from the following specification taken in connection with the accompanying drawings.

DESCRIPTION OF THE DRAWINGS

FIG. 1 is a perspective view of a continuous business form made according to the invention in a zigzag folded stack;

FIG. 2 is an enlarged, fragmentary plan view of the business form with parts broken away for clarity;

FIG. 3 is a somewhat schematic sectional view of the business form taken approximately along the line 3—3 in FIG. 2;

FIG. 4 is a view similar to FIG. 3, but of one type of prior art structure; and FIG. 5 is a view similar to FIGS. 3 and 4, but of another type of prior art structure.

DESCRIPTION OF THE PREFERRED EMBODIMENT

An exemplary embodiment of a continuous business form made according to the invention is illustrated in the drawings and with reference to FIG. 1 is seen to be folded in a zigzag folded stack, generally designated 10. Alternatively, the business form could be in cut sheet form if desired. The form is composed of a plurality of individual form lengths 12 folded as stated on cross lines of weakening 14 which are generally in the form of perforations extending across the plies defining the form.

According to the invention, three plies are utilized to define the business form. A first is an elongated ply 16 of label stock (FIGS. 2 and 3) coated on one side with pressure sensitive adhesive 18 as schematically illustrated in FIG. 3. The side of the ply 16 opposite the adhesive 18 is adapted to be printed upon in any suitable fashion.

A second ply is an elongated ply of conventional release liner stock 20. According to the preferred embodiment of the invention, the width of the release liner ply 20 is equal to the width of the label ply 16. However, this is not an absolutely necessary relationship as will appear.

The side of the release liner ply 20 facing the label ply 16 will typically be coated with any of a variety of known, relatively waxy substances to facilitate peeling of the label ply 16 from the release liner stock 20.

According to the invention, and as seen in FIGS. 2 and 3, the plies 16 and 20 are laterally offset from each other. Opposed longitudinal edges of the ply 16 are shown at 22 and 24, while opposed longitudinal edges of the ply 20 are shown at 26 and 28.

As a consequence of this, a relatively narrow longitudinal strip 30 of adhesive 18 on the ply 16 that is not contacted by the ply 20 exists immediately adjacent the edge 24. Additionally, the longitudinal edge 26 of the ply 20 remote from the strip 30 is seen to be uncovered on both sides, and as best seen in FIG. 2, includes a series of aligned holes 32 defining conventional pin feed holes so that the form is provided with an elongated control punch margin 34. If desired, the ply 20 may be provided with a longitudinal perforation 36 in alignment with the edge 22 of the ply 16 so as to allow the control punch margin 34 to be removed.

A record or message bearing ply of any desired stock is shown at 40. One longitudinal edge 42 of the ply 40 underlies the ply 16 at the narrow longitudinal strip 30 and is adhered to the ply 16 by the adhesive at that location. If desired, the ply 40 may have a longitudinal line of perforation 44 that underlies the edge 24 of the ply 16 so as to allow separation of the two. Alternatively or additively the ply 16 may include a line of perforation 45 aligned with the edge 28 (or, for that matter, the edge 42 or located just either side of either) to allow the label and release liner to be separated from the record ply 40 after it has been printed upon. The ply 40, at each form length, is adapted to be printed with variable information by a printer as is well known.

Parts of the ply 16 may be provided with label shaped die cuts 46 to define individual labels 48 surrounded by a matrix strip 49. The labels 48 may be removed from the form by peeling from the ply 20 as desired. Alternatively, the labels 48 could be formed by butt cutting or perforating the ply 16 and the matrix strip 49 omitted.

A preferred method of making the business form involve the utilization of a release liner of a given width adhered, in coextensive relation, to a ply of label stock of the identical width. The two plies are delaminated utilizing conventional equipment, and one of the plies, by means of angle bars or the like, is moved laterally sufficiently to produce the desired offset. The release liner and label stock plies are then relaminated and the record or message bearing ply adhered to the label ply at the longitudinal strip 30.

During such processing, printing of the various plies may occur as desired, and after the delamination, the pin feed holes 32 added. The die cuts 46 will typically be disposed in the form following relamination.

As an alternative, where the control punch margin 34 is not required, a running cut could be made through the release liner ply 20, only. The resulting strip is removed to expose the adhesive on the ply 16. The record ply 40 is then joined to the exposed adhesive. This allows the form to be produced without requiring delaminating and ply shifting equipment.

As can be readily appreciated from FIG. 3 and the foregoing description, the label stock ply 16 and the record of message bearing ply 40 may be made of differing stocks if required by the particular application to which the form is to be put since the two are separate. This is in contrast to one type of prior art constructions such as that shown in FIG. 4. In this construction, a single relatively wide ply 60 serves as both the label section and the message or record bearing portion of the form, having a release liner ply 62 adhered as by pressure sensitive adhesive 64 to one side of the ply 60 which has been treated to act as the release liner.

Similarly, as can be seen from FIG. 3, at the junction of the various plies, the maximum thickness of a form made according to the invention is equal to the thickness of the pressure sensitive adhesive 18, the thickness of the label stock 16, and the thickness of the thicker of the release liner ply 20 or the record or message bearing ply 40. This is in contrast to a prior art structure that allows the release liner 20 and the record or message bearing ply to be formed of differing materials such as is shown in FIG. 5. In this case, the release liner ply is shown at 70 and is adhered as by pressure sensitive adhesive 72 to the label stock ply 74.

Along one longitudinal edge of the assembly of the plies 70 and 74, a glue line 76 is located on the ply 70 oppositely of the ply 74 and the record or message bearing ply 78 adhered to the assembly of plies 70 and 74 by such glue line 76. As a consequence of this construction, the thickness of the prior art form may be virtually double that of a form made according to the invention. This may cause processing difficulty because of the increased rigidity and/or thickness; may cause refolding difficulties for the same reason; and may cause packing difficulties because of the relative thinness of the form to either side of the glue line 76 and settling within packing cartons or the like ultimately resulting in wrinkling.

Still a further advantage results when a form made according to the invention is constructed by the method previously described. In the usual case, a combined pressure sensitive adhesive coated label stock and release liner such as shown at 70, 72 and 74 will be in roll form. Thus, the radially inner one of the plies in the roll will be of slightly shorter length from one end to the other, which in turn can result in wrinkling of the longer ply as it is adhered to the shorter ply in the length of the shorter ply. However, according to the invention, such wrinkling is avoided since the forces resulting from the difference in lengths are eliminated during the delaminating and relaminating process.

I claim:

1. A continuous business form comprising:

an elongated ply of label stock of a desired width and having one side coated with a pressure sensitive adhesive;

an elongated ply of release liner stock of about said desired width and having a release side engaged with said adhesive on said one side;

said release liner and said label stock plies being laterally offset from one another so that a narrow longitudinal strip of adhesive unengaged with said release liner exists; and an elongated ply of record or message bearing stock adhered at one edge to said label stock at said narrow longitudinal strip of adhesive.

2. The continuous business form of claim 1 wherein the longitudinal edge of said release liner remote from said narrow longitudinal strip of adhesive is uncovered on both sides and includes aligned holes defining a control punch margin for forms feeding purposes.

3. The continuous business form of claim 1 wherein individual form lengths of said continuous business form are delimited by cross lines of weakening extending across said plies.

4. The continuous business form of claim 1 wherein said release liner and said label stock plies are of equal width and are laterally offset from each other by firstly delaminating coextensive plies, laterally shifting one ply relative to the other and relaminating the plies.

5. The continuous business form of claim 1 wherein said label stock and said record or message bearing stock are different materials.

6. The continuous business form of claim 1 including die cuts in said label stock defining individual labels that may be peeled from said release liner stock.

7. A business form comprising:

a sheet of label stock of a desired width and having one side coated with a pressure sensitive adhesive;

a sheet of release liner stock of about said desired width and having a release side engaged with said adhesive on said one side;

said release liner and said label stock sheets being laterally offset from one another so that a narrow strip of adhesive unengaged with said release liner exists; and a sheet of record or message bearing stock adhered at one edge to said label stock at said narrow strip of adhesive.

8. The business form of claim 7 wherein each of said sheets is one elongated ply, said release liner ply, oppositely of said strip having control punch holes and said business form is a continuous business form.

9. The business form of claim 7 wherein said label stock sheet and said record or message bearing sheet are formed of different stocks.

* * * * *